(12) United States Patent
Huh et al.

(10) Patent No.: US 8,199,290 B2
(45) Date of Patent: Jun. 12, 2012

(54) DISPLAY DEVICE AND METHOD OF MANUFACTURING THE SAME

(75) Inventors: Soo-Jeong Huh, Chungcheongnam-do (KR); Nam-Seok Lee, Gyeonggi-do (KR); Won-Gap Yoon, Gyeonggi-do (KR); So-Youn Park, Gyeonggi-do (KR); Si-Heun Kim, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/982,424

(22) Filed: Dec. 30, 2010

(65) Prior Publication Data

US 2011/0205463 A1    Aug. 25, 2011

(30) Foreign Application Priority Data

Feb. 19, 2010  (KR) .......................... 10-2010-0015185

(51) Int. Cl.
*C09K 19/00* (2006.01)
*C09K 19/06* (2006.01)
*C09K 19/52* (2006.01)

(52) U.S. Cl. .............. 349/118; 349/1; 349/56; 349/167; 430/20; 428/1.1; 252/299.01; 252/299.6

(58) Field of Classification Search ........................ None
See application file for complete search history.

(56) References Cited

U.S. PATENT DOCUMENTS

| 7,079,218 B2 * | 7/2006 | Park et al. ...................... 349/191 |
| 7,545,461 B2 * | 6/2009 | Kondo et al. ................... 349/69 |
| 7,651,629 B2 * | 1/2010 | Takeda ........................ 252/299.6 |

* cited by examiner

*Primary Examiner* — Geraldina Visconti
(74) *Attorney, Agent, or Firm* — Innovation Counsel LLP

(57) ABSTRACT

A display device includes a display panel, a backlight assembly providing a light to the display panel, a receiving container receiving the backlight assembly and a heat sink member disposed between the backlight assembly and the receiving container. The display panel includes a first substrate including a pixel electrode formed on a pixel region and electrically connected to a switching device, a first alignment layer formed on the pixel electrode, a second substrate including a common electrode layer facing the first substrate, a second alignment layer formed on the common electrode layer, and a liquid crystal layer including a liquid crystal composition having a nematic-to-isotropic transition temperature higher than about 80° C. Thus, black bruising of liquid crystal may be prevented and/or reduced, thereby enhancing a display quality.

15 Claims, 6 Drawing Sheets

DISPLAY DEVICE AND METHOD OF MANUFACTURING THE SAME

This application claims priority to Korean Patent Applications No. 2010-0015185, filed on Feb. 19, 2010, and all the benefits accruing therefrom under 35 U.S.C. §119, the contents of which are herein incorporated by reference in their entirety.

BACKGROUND OF THE INVENTION

1. Field of the Invention

The present invention relates to a display device and a method of manufacturing the display device. More particularly, a display device capable of improving display quality and a method of manufacturing the display device are provided.

2. Description of the Related Art

In general, a liquid crystal display (LCD) device includes a liquid crystal display panel that controls the transmissivity of incident light to display an image, and a backlight assembly disposed under the display panel to provide light to the liquid crystal display panel.

The backlight assembly includes a light source that generates the light used for displaying an image. Examples of such light sources include cold cathode fluorescent lamps (CCFL), flat fluorescent lamps (FFL), light emitting diodes (LED) and the like.

Backlight assemblies may be divided into edge-typed backlight assemblies and direct-typed backlight assemblies, depending on the position of the light source. The direct-typed backlight assembly includes a plurality of light sources disposed under the liquid crystal display panel to irradiate light directly toward the liquid crystal display panel. The edge-typed backlight assembly includes a light source at a side of a light guide plate to provide light to the liquid crystal display panel through the light guide plate.

However, when the edge-typed backlight assembly is driven so that a high temperature occurs, a liquid crystal in a liquid crystal display panel may be damaged, thereby causing black defects and the like.

SUMMARY OF THE INVENTION

A display device capable of improving a display quality is provided.

A method of manufacturing the display device is also provided.

In one aspect, a display device includes a display panel, a backlight assembly configured to provide light to the display panel, a receiving container receiving the backlight assembly and a heat sink member disposed between the backlight assembly and the receiving container. The display panel includes a first substrate including a pixel electrode formed on a pixel region and electrically connected to a switching device, and a first alignment layer formed on the pixel electrode, a second substrate including a common electrode layer facing the first substrate, and a second alignment layer formed on the common electrode layer, and a liquid crystal layer including a liquid crystal composition having a nematic-to-isotropic transition temperature higher than about 80° C. interposed between the first substrate and the second substrate.

The liquid crystal composition includes a first liquid crystal compound and a second liquid crystal compound, the first liquid crystal compound includes at least one selected from the group consisting of compounds represented by the following Chemical Formulas 1 and 2, and the second liquid crystal compound includes a compound represented by the following Chemical Formula 3, wherein $X_1$, $X_2$, $X_3$ and $X_4$ independently represent an alkyl group having 1 to 4 carbon atoms, a fluorine atom or a chlorine atom. $Z_1$, $Z_2$ and $Z_3$ independently represent

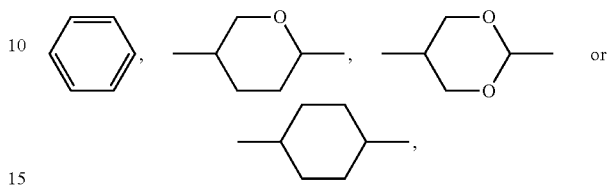

and Y represents a fluorine atom or a hydrogen atom.

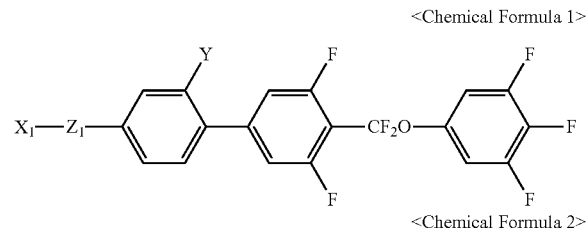

<Chemical Formula 1>

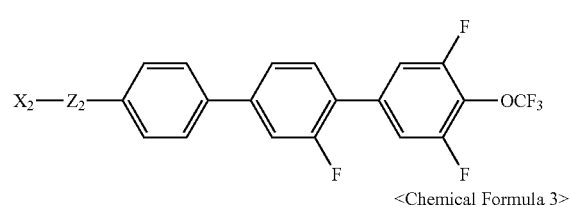

<Chemical Formula 2>

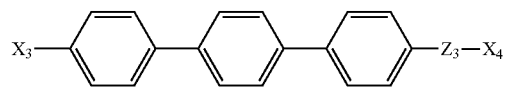

<Chemical Formula 3>

In one aspect, the content of each of the first and second liquid crystal compounds is about 4% to about 8% by weight based on a total weight of the liquid crystal composition. The liquid crystal composition has a dielectric anisotropy ($\Delta\in$) of about 7 to about 10. The liquid crystal composition has a refractive index anisotropy ($\Delta n$) of about 0.1 to about 0.12. The liquid crystal composition has a rotational viscosity of about 60 mPa·s to about 70 mPa·s. Each of the first and second alignment layers includes a polyimide compound and a polyamic acid compound.

In one aspect, the backlight assembly includes a light guide plate configured to guide the light toward the display panel and a lamp unit facing a side surface of the light guide plate. The heat sink member is overlapped with the lamp unit. A length of a longer side of the heat sink member is substantially the same as that of a longer side of the display panel, and a length of a shorter side of the heat sink member is about 100 mm to about 160 mm.

A method for manufacturing a display device is also provided. In the method, a pixel electrically connected to a switching device is formed on a pixel region of a first substrate. A first alignment layer is formed on the pixel electrode. A common electrode layer is formed on a surface of a second substrate facing the first substrate. A second alignment layer is formed on the common electrode layer. A liquid crystal composition is interposed between the first and second substrates, and the liquid crystal composition has a nematic-to-isotropic transition temperature higher than about 80° C. A voltage is applied to the first and second substrates interposing the liquid crystal composition therebetween to pre-tilt the liquid crystal composition by an angle of about 4.5° to about 5.5°, thereby forming a display panel having a liquid crystal layer. A backlight assembly is formed to provide a light to the display panel. A receiving container is formed to receive the backlight assembly. A heat sink member is disposed between the backlight assembly and the receiving container.

In one aspect, the voltage is about 4 V to about 5 V.

The liquid crystal composition includes a first liquid crystal compound and a second liquid crystal compound, the first liquid crystal compound includes at least one selected from the group consisting of compounds represented by the following Chemical Formulas 1 and 2, and the second liquid crystal compound includes a compound represented by the following Chemical Formula 3, wherein $X_1$, $X_2$, $X_3$ and $X_4$ independently represent an alkyl group having 1 to 4 carbon atoms, a fluorine atom or a chlorine atom. $Z_1$, $Z_2$ and $Z_3$ independently represent

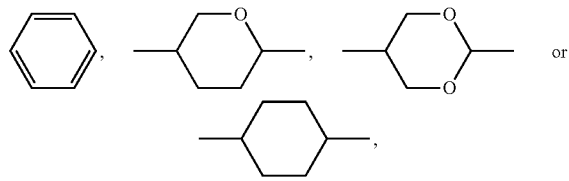

and Y represents a fluorine atom or a hydrogen atom.

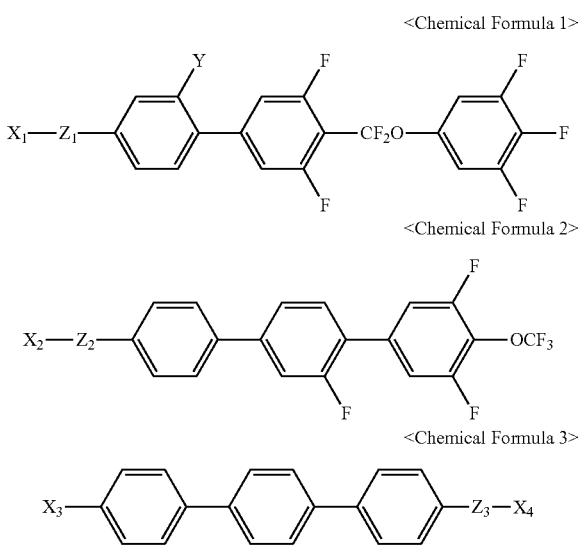

In one aspect, each of the first and second alignment layers includes a polyimide compound and a polyamic acid compound. The backlight assembly includes a light guide plate guiding the light to provide the light to the display panel and a lamp unit facing a side surface of the light guide plate. The heat sink member is overlapped with the lamp unit.

A liquid crystal composition employed in a display device has a nematic-to-isotropic transition temperature higher than about 80° C. Thus, black bruising of liquid crystal may be prevented and/or reduced, thereby enhancing a display quality.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

The present invention is described more fully hereinafter with reference to the accompanying drawings, in which exemplary embodiments are shown.

Figure 1:
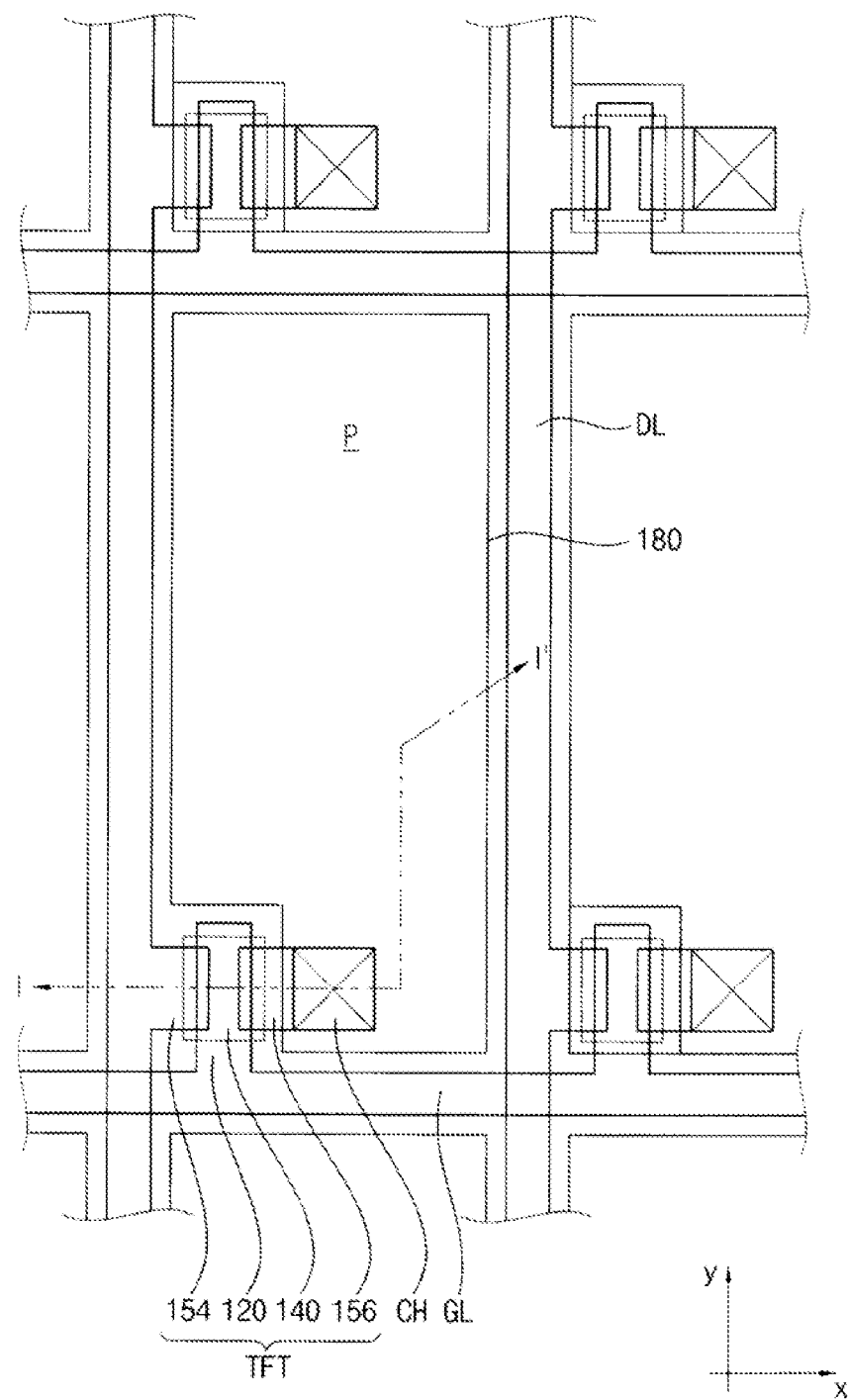
FIG. 1 is a plan view illustrating a display panel according to an example embodiment.
Figure 2:
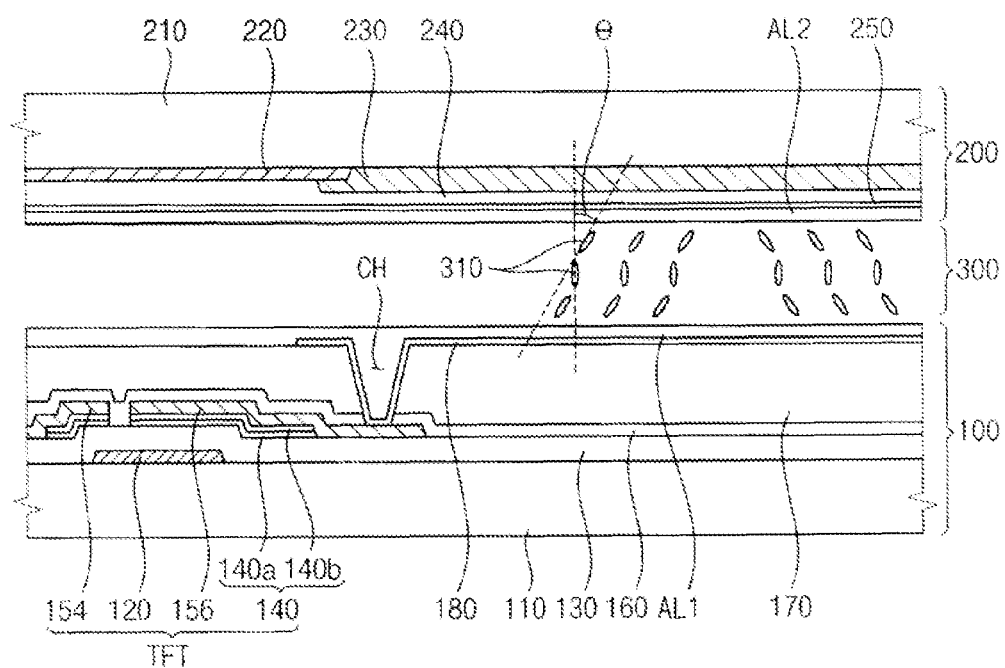
FIG. 2 is a cross-sectional view taken along the line I-I' of FIG. 1.

FIG. 1 is a plan view illustrating a display panel according to an example embodiment. FIG. 2 is a cross-sectional view taken along the line I-I' of FIG. 1.

Referring to FIGS. 1 and 2, a display panel 500 according to an example embodiment includes a first substrate 100, a second substrate 200 and a liquid crystal display layer 300 interposed between the first and second substrates 100 and 200.

The first substrate 100 includes a first base substrate 110, gate lines GL, data lines DL, a switching element TFT, a passivation layer 160, an organic insulating layer 170, a pixel electrode 180 and a first alignment layer AL1.

The gate lines GL extend in a first direction X, and the data lines DL extend in a second direction Y intersecting the first direction X. A plurality of pixel regions P may be defined by the gate lines GL and the data lines DL.

The switching element TFT includes a gate electrode 120, a gate insulating layer 130, a source electrode 154, a drain electrode 156 and an active layer 140.

The gate insulating layer 130 is formed on the gate electrode 120.

The source electrode 154 extends to from the date line DL, and is partially overlapped with the gate electrode 120 on the gate insulating layer 130.

The drain electrode 156 is spaced apart from the source electrode 154 by a predetermined distance, and is partially overlapped with the gate electrode 120 on the gate insulating layer 130.

The active layer 140 includes an amorphous silicon (a-Si:H) layer 140a and an ohmic contact layer 140b including an n+ amorphous silicon (n+ a-Si:H) and deposited thereon.

The passivation layer 160 is formed on the first base substrate 110 having the switching element TFT to cover the switching element TFT.

The organic insulating layer 170 is formed on the first base substrate 110 having the passivation layer 160 formed thereon. A contact hole CH formed through the passivation layer 160 and the organic insulating layer 170 to expose an edge portion of the drain electrode 156.

The pixel electrode 180 is formed on the organic insulating layer 170 and positioned to correspond to the positions of each of the pixel regions P. The pixel electrode 180 includes a transparent conductive material. Examples of the transparent conductive material for the pixel electrode 180 may include indium zinc oxide (IZO) or indium tin oxide (ITO). The pixel electrode 180 makes contact with the drain electrode 156 through the contact hole CH.

The first alignment layer AL1 is formed on the first base substrate 110 having the pixel electrode 180 formed thereon. When a voltage is applied to liquid crystal molecules 310, the first alignment layer AL1 pre-tilts the liquid crystal molecules 310 by a predetermined angle θ with respect to a vertical direction.

The first alignment layer AL1 may include, for example, a polyimide compound and a polyamic acid compound.

Generally, when a display apparatus that employs an edge-type backlight assembly is cooled slowly after being driven with a high temperature mode, a reverse tilt of the liquid crystal molecules 310 that have small pre-tilt angles may be caused in a region of the display that is over the pixel electrode and adjacent to a data line. The reverse tilt may form a separate domain in the pixel region, thereby deteriorating a display quality of the display panel.

The first alignment layer AL1 of the display device according to an example embodiment may increase the pre-tilt angle of the liquid crystal molecules 310 by more than about 4.5° with respect to a vertical plane. Thus, the reverse tilt may be reduced and/or prevented by use of the first alignment layer AL1.

The second substrate 200 includes a black matrix 220, a color filter 230, an overcoating layer 240, a common electrode layer 250 and a second alignment layer AL2, which are formed on a second base substrate 210 facing the first substrate 100.

The black matrix 220 is formed on the second base substrate 210 in a position that corresponds to (i.e., is over) the position of switching element TFT on the first substrate 100, and may prevent an external light from entering the liquid crystal layer 300. Alternatively, the black matrix 220 may be formed on the first substrate 100, which corresponds to a lower substrate.

The color filter 230 may include a first color filter, a second color filter and a third color filter. For example, the first color filter represents red, the second color filter represents blue, and the third color filter represents green. Alternatively, the color filter 230 may be formed on the first substrate 100, which corresponds to a lower substrate.

The common electrode layer 250 faces the pixel electrode 180, and is formed entirely on a surface of the second base substrate 210. The common electrode layer 250 may include a same material as the pixel electrode 180.

The liquid crystal layer 200 is disposed between the first substrate 100 and the second substrate 200, and includes a liquid crystal composition including the liquid crystal molecules 310.

The liquid crystal molecules 310 may be twisted nematic type. Thus, the liquid crystal molecules 310 may be aligned such that a longitudinal axis is substantially perpendicular to the first and second substrates 100 and 200 before an electric field is applied across the liquid crystal layer 300 by the pixel electrode 180 and the common electrode layer 250.

Generally, conventional liquid crystal compositions may have a low heat stability and a low nematic-to-isotropic transition temperature (Tni). Thus, in a conventional display apparatus, the temperature of the display panel at a region that is adjacent to the lamp may be increased and may become higher than the nematic-to-isotropic transition temperature of the liquid crystal composition due to increased temperature of the lamp. As a result, a black bruising of liquid crystal molecules may be caused.

The liquid crystal composition used for the display device according to an example embodiment has a nematic-to-isotropic transition temperature higher than about 80° C. Thus, the display device including the liquid crystal composition may prevent and/or reduce the black bruising of liquid crystal molecules.

The liquid crystal composition includes a first liquid crystal compound and a second liquid crystal compound. Examples of the first liquid crystal compound may include compounds represented by the following Chemical Formulas 1 and 2. These may be used alone or in a combination. Furthermore, examples of the second liquid crystal compound may include a compound represented by the following Chemical Formula 3.

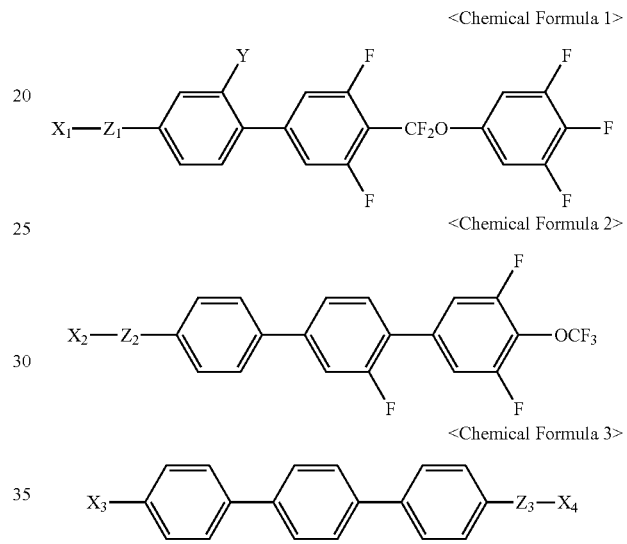

In Chemical Formulas 1 to 3, $X_1$, $X_2$, $X_3$ and $X_4$ independently represent an alkyl group having 1 to 4 carbon atoms, a fluorine atom or a chlorine atom. $Z_1$, $Z_2$ and $Z_3$ independently represent

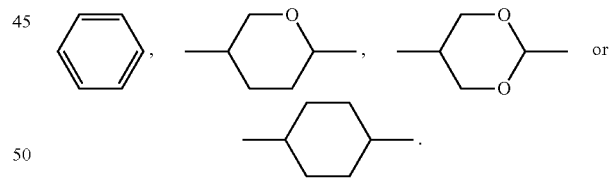

Y represents a fluorine atom or a hydrogen atom.

The content of each of the first and second liquid crystal compounds is preferably about 4% to about 8% by weight based on a total weight of the liquid crystal composition. When the content of each of the first and second liquid crystal compounds is less than 4% by weight, a nematic-to-isotropic transition temperature of the liquid crystal composition may be reduced, thereby resulting in black bruising of liquid crystal molecules. When the content of each of the first and second liquid crystal compounds is more than 8% by weight, characteristics of the liquid crystal composition may be changed to be closer to a solid state. Thus, the content of each of the first and second liquid crystal compounds may be preferably about 4% to about 8% by weight based on a total weight of the liquid crystal composition.

The first and second liquid crystal compounds have a 4-ring structure, thereby maintaining a high dielectric anisotropy, and may enhance alignment of liquid crystal molecules.

The liquid crystal composition typically has a proper dielectric anisotropy, a proper refractive index anisotropy and a low viscosity. The liquid crystal composition having a high dielectric anisotropy may reduce the threshold voltage of the liquid crystal composition, thereby reducing the power consumption of the display device. The liquid crystal composition having a proper refractive index anisotropy may increase the contrast of the display device. Furthermore, the liquid crystal composition having a low viscosity may increase a response speed of a display device.

The liquid crystal composition may have a dielectric anisotropy (Δ∈) of about 7 to about 10. When the dielectric anisotropy of the liquid crystal composition is less than about 7, degradation of the display device may occur. When the dielectric anisotropy of the liquid crystal composition is more than about 10, the threshold voltage may be increased, and as a result, the drive voltage may need to be increased. Thus, the liquid crystal composition may typically have a dielectric anisotropy of about 7 to 10, more typically about 7.5 to about 8.5.

The liquid crystal composition may have a refractive index anisotropy (Δn) of about 0.1 to about 0.12. When the refractive index anisotropy of the liquid crystal composition is less than about 0.1, the contrast of the display device may be reduced, thereby reducing the color reproducibility. When the refractive index anisotropy of the liquid crystal composition is more than about 0.12, the threshold voltage may be increased, and as a result the drive voltage may need to be increased. Thus, the liquid crystal composition may typically have a refractive index anisotropy of about 0.1 to 0.12, more typically about 0.113 to about 0.115.

The liquid crystal composition may have a rotational viscosity of about 60 mPa·s to about 70 mPa·s. When the rotational viscosity of the liquid crystal composition is less than about 60 mPa·s, the response speed of the display device may be reduced. When the rotational viscosity of the liquid crystal composition is more than about 70 mPa·s, the viewing angle may be reduced, and degradation of the display device may occur. Thus, the liquid crystal composition may typically have a rotational viscosity of about 60 mPa·s to about 70 mPa·s, and more typically about 63 mPa·s to about 68 mPa·s. For example, the liquid crystal composition may have a rotational viscosity of about 68 mPa·s, a dielectric anisotropy of about 8.8 and a refractivity anisotropy of about 0.1147. Furthermore, the liquid crystal composition may include, for example, about 5% by weight of the first liquid crystal compound based on a total weight of the liquid crystal composition and about 6% by weight of the second liquid crystal compound based on a total weight of the liquid crystal composition.

The first and second liquid crystal compounds may be pre-tilted by the first and second alignment layers AL1 and AL2 to a predetermined angle with respect to a vertical direction.

The liquid crystal composition has a nematic-to-isotropic transition temperature higher than about 80° C. Thus, including the liquid crystal composition in a display device may prevent and/or reduce the black bruising of liquid crystal molecules adjacent to a lamp in the display device, thereby improving the display quality.

Furthermore, the first and second alignment layers AL1 and AL2 include, for example, a polyimide compound and a polyamic acid compound. Thus, a pre-tilt angle of liquid crystal molecules is increased, and a reverse-tilt may be prevented and/or reduced.

FIGS. 3A to 3F are cross-sectional views illustrating a method of manufacturing the display panel illustrated in FIG. 2.

Figure 3A:
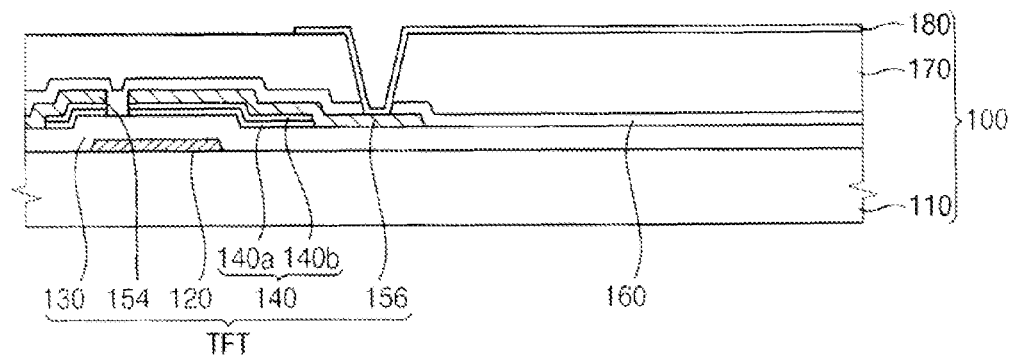
FIGS. 3A to 3F are cross-sectional views illustrating a method of manufacturing the display panel illustrated in FIG. 2.

Referring to FIG. 3A, a gate pattern is formed on the first base substrate 110. The gate pattern includes the gate line GL and the gate electrode 120. The gate insulating layer 130 is formed on the first base substrate 110 having the gate pattern. The active pattern 140 is formed on the gate insulating layer 130.

A source pattern is formed on the first base substrate 110 having the active pattern 140. The source pattern includes the data line DL, the source electrode 154 and the drain electrode 156. The passivation layer 160 and the organic insulating layer 170 are sequentially formed on the first base substrate 110 having the source pattern.

The pixel electrode 180 is formed on the first base substrate 110 having the passivation layer 160 and the organic insulating layer 170. The pixel electrode 180 is disposed on each of the pixel regions P.

Figure 3B:
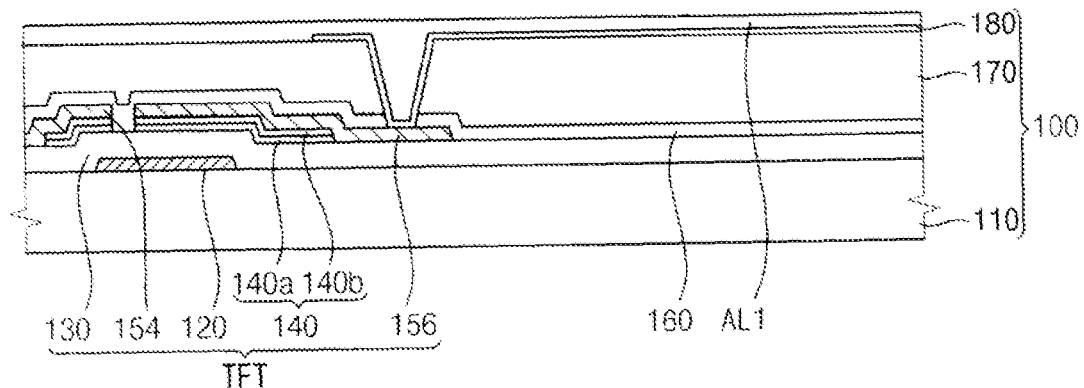

Referring to FIG. 3B, the first alignment layer AL1 is formed on the first base substrate 10 having the pixel electrode 180. The first alignment layer AL1 may be formed from, for example, a polyimide compound. In this exemplary embodiment, the first alignment layer AL1 is formed from a mixture of a polyimide compound and a polyamic acid compound.

A composition for forming the first alignment layer AL1 is prepared, for example, by dissolving a mixture of a polyimide compound and a polyamic acid compound, which has a solid phase, in an organic solvent. Examples of the organic solvent may include, but are not limited to, chlorobenzene, N-methylpyrrolidone, dimethylsulfoxide, dimethylformamide, toluene, chloroform, gamma-butyrolactone, methylcellosolve, butylcellosolve, butylcarbitol, tetrahydrofuran and the like. These may be used alone or in combinations thereof.

The mixture of the polyimide compound and the polyamic acid compound, which has a solid phase, may include about 20% by weight of the polyimide compound and about 80% by weight of the polyamic acid compound. When the content of the polyamic acid compound is less than about 80% by weight, a pre-tilt angle of liquid crystal molecules may be reduced, thereby causing a reverse-tilt. When the content of the polyamic acid compound is more than about 80% by weight, a viscosity of the composition may be increased, thereby deteriorating coating characteristics of the composition. Thus, the mixture of the polyimide compound and the polyamic acid compound, which has a solid phase, preferably includes about 20% by weight of the polyimide compound and about 80% by weight of the polyamic acid compound.

The first alignment layer AL1 may be formed entirely on a surface of the first base substrate 110. For example, the first alignment layer AL1 may be formed by using a rubbing fabric that includes cotton.

Figure 3C:
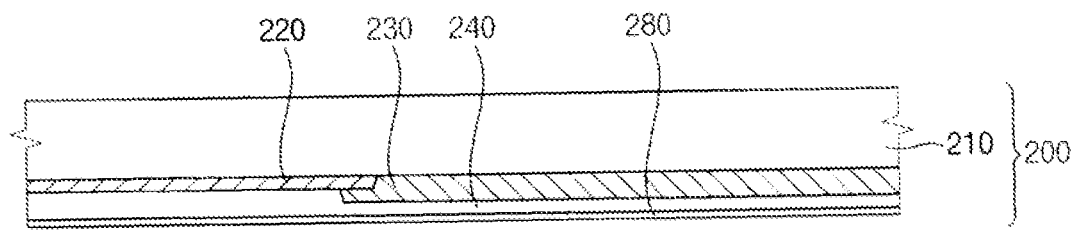
Figure 3D:
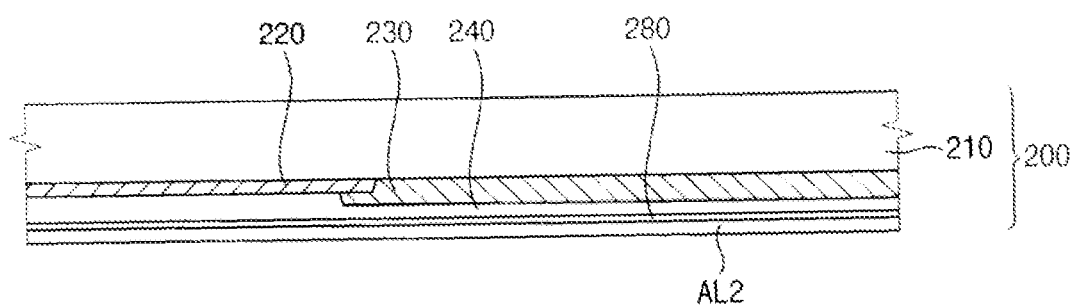

Referring to FIG. 3C, the black matrix 220 is formed on the second base substrate 210. The black matrix 220 may be formed on a region of the base substrate 210 that overlaps with the gate pattern and/or the source pattern.

The color filter 230 is formed on the second base substrate 210 having the black matrix 220. The color filter 230 may be formed on a region of the base substrate 210 that overlaps with the pixel region.

The overcoating layer 240 is formed on the second base substrate 210 having the black matrix 220 and the color filter 230. The common electrode layer 250 is formed on the second base substrate 210 having the overcoating layer 240. The common electrode layer 250 may be formed entirely on a surface of the second base substrate 210 without being patterned.

The second alignment layer AL2 is formed on the second base substrate 210 having the common electrode layer 250 formed thereon. The second alignment layer AL2 may be formed entirely on a surface of the second base substrate 210. The second alignment layer AL2 may be substantially the same as the first alignment layer AL1 except for being formed on the second substrate 200. Thus, further explanation of the second alignment layer AL2 will be omitted.

Figure 3E:
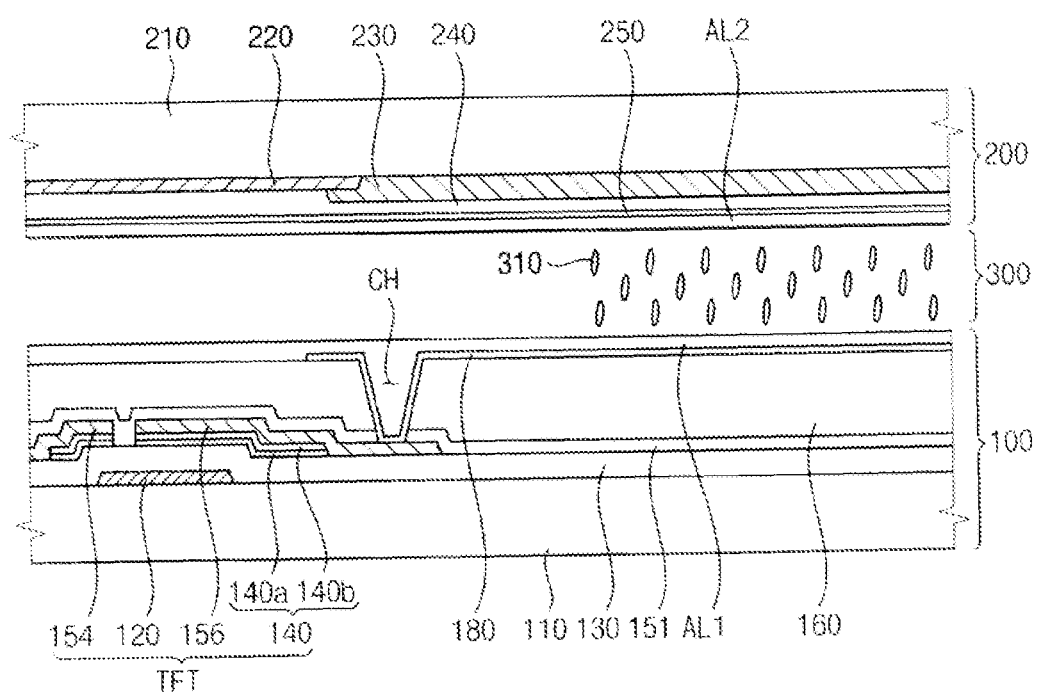

Referring to FIG. 3E, the first substrate 100 having the first alignment layer AL1 is combined with the second substrate 200 having the second alignment layer AL2 so that the first and second alignment layers AL1 and AL2 face each other. A liquid crystal composition is interposed between the first and second substrates 100 and 200. The liquid crystal composition may be injected between the first and second alignment layers AL1 and AL2 after the first and second substrates 100 and 200 are combined. Alternatively, the liquid crystal composition may be dropped on the first substrate 100 and the second substrate 200 may be combined with the first substrate 100 to interpose the liquid crystal composition between the first and second substrates 100 and 200 after the liquid crystal composition is dropped on the first substrate 100.

The liquid crystal composition has a nematic-to-isotropic transition temperature higher than about 80° C.

The liquid crystal composition includes a first liquid crystal compound and a second liquid crystal compound. Examples of the first liquid crystal compound may include, but are not limited to, compounds represented by the following Chemical Formulas 1 and 2. These may be used alone or in a combination. Furthermore, examples of the second liquid crystal compound may include, but are not limited to, a compound represented by the following Chemical Formula 3.

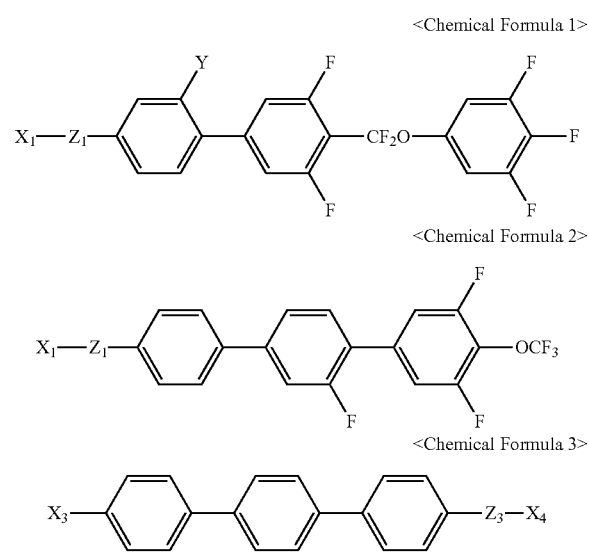

In Chemical Formulas 1 to 3, $X_1$, $X_2$, $X_3$ and $X_4$ independently represent an alkyl group having 1 to 4 carbon atoms, a fluorine atom or a chlorine atom. $Z_1$, $Z_2$ and $Z_3$ independently represent

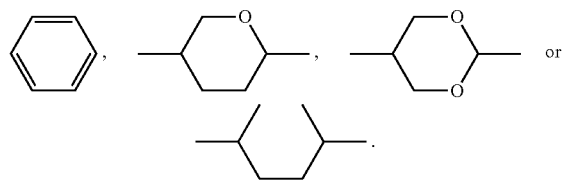

Y represents a fluorine atom or a hydrogen atom.

Liquid crystal molecules 310 in the liquid crystal composition may be aligned in a direction substantially perpendicular to a surface of the first substrate 100 when a voltage for forming an electric field across the liquid crystal layer 300 is not applied to the first and second substrates 100 and 200.

Figure 3F:
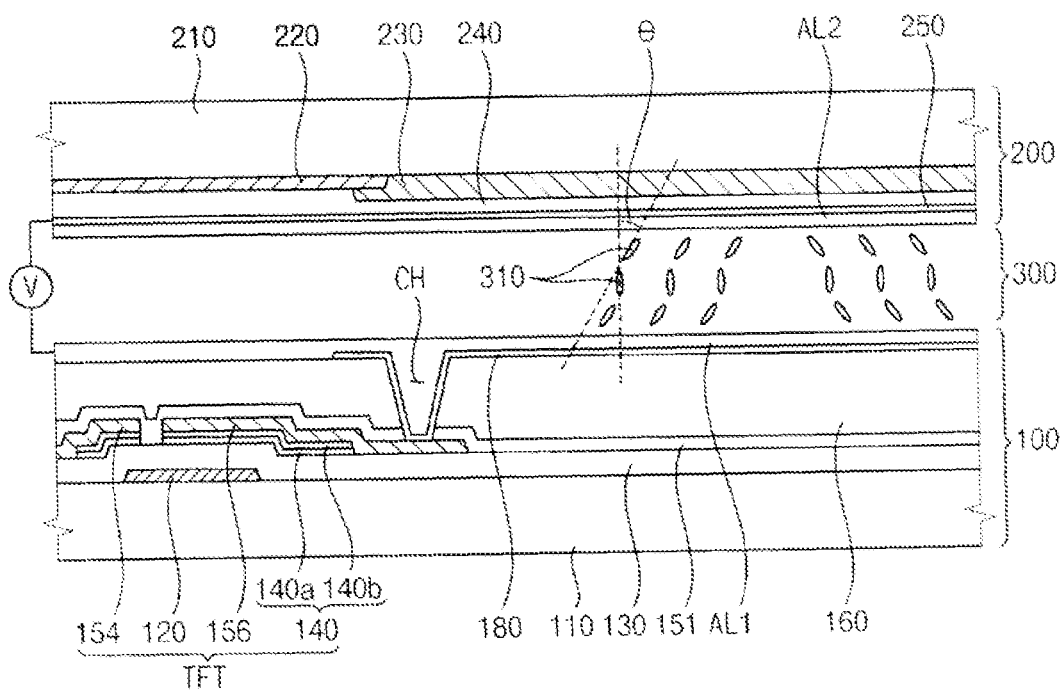

Referring to FIG. 3F, a voltage is applied to the first and second substrates 100 and 200 to form a fringe field so that the liquid crystal molecules 310 have a pre-tilt angle. The voltage may be, for example, about 4 V to about 5 V. The liquid crystal molecules 310 may have a pre-tilt angle of about 4.5° to about 5.5° with respect to a direction perpendicular to the first and second substrates 100 and 200.

The liquid crystal composition has a nematic-to-isotropic transition temperature higher than about 80° C. Thus, including the liquid crystal composition in a display device may prevent and/or reduce the black bruising of liquid crystal molecules adjacent to a lamp, thereby enhancing a display quality.

Furthermore, the first and second alignment layers AL1 and AL2 typically include a polyimide compound and a polyamic acid compound. Thus, a pre-tilt angle of liquid crystal molecules is increased, and a reverse-tilt of the liquid crystal molecules may be prevented and/or reduced.

Figure 4:
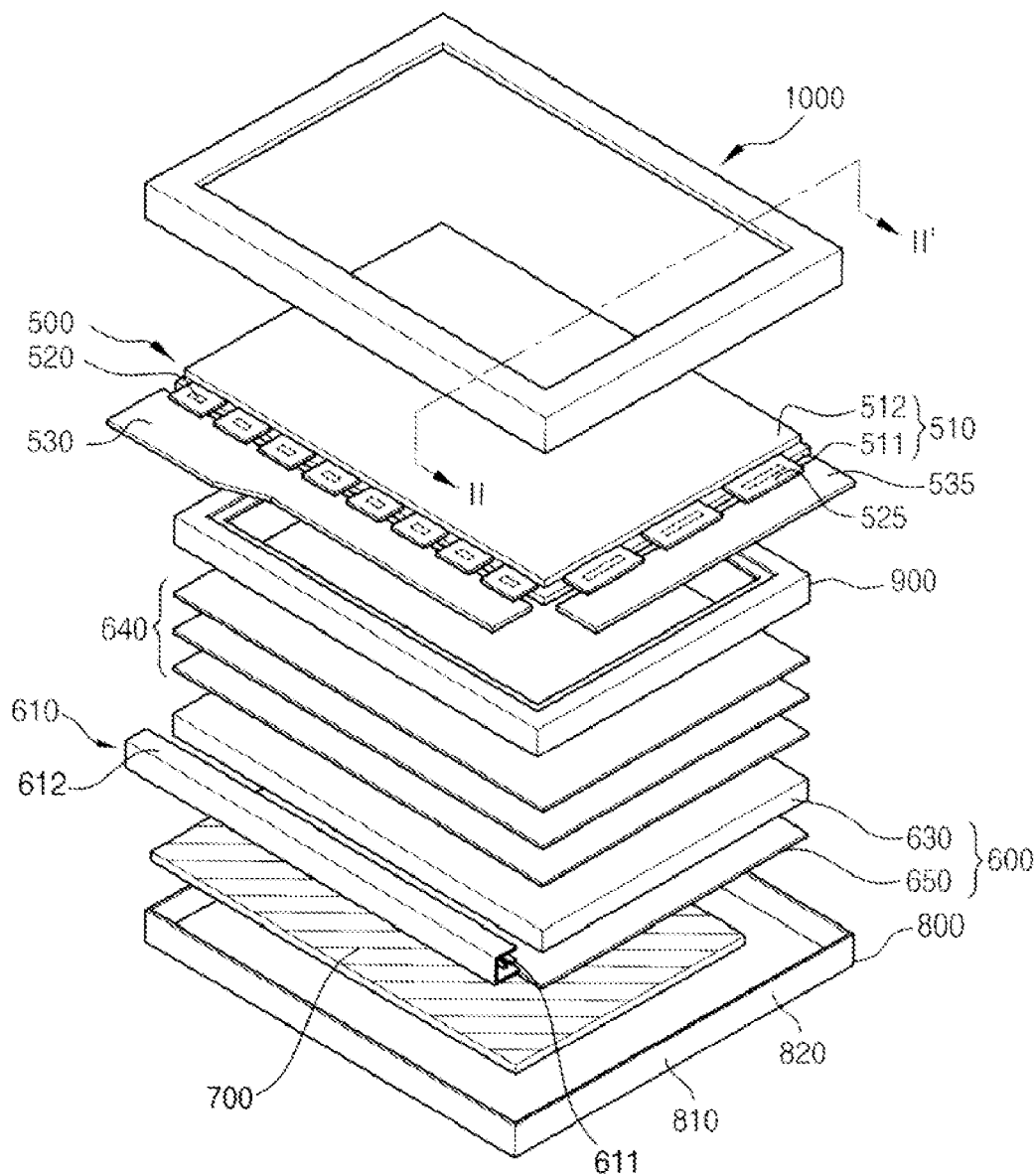
FIG. 4 is a plan view illustrating a display device according to an example embodiment.
Figure 5:
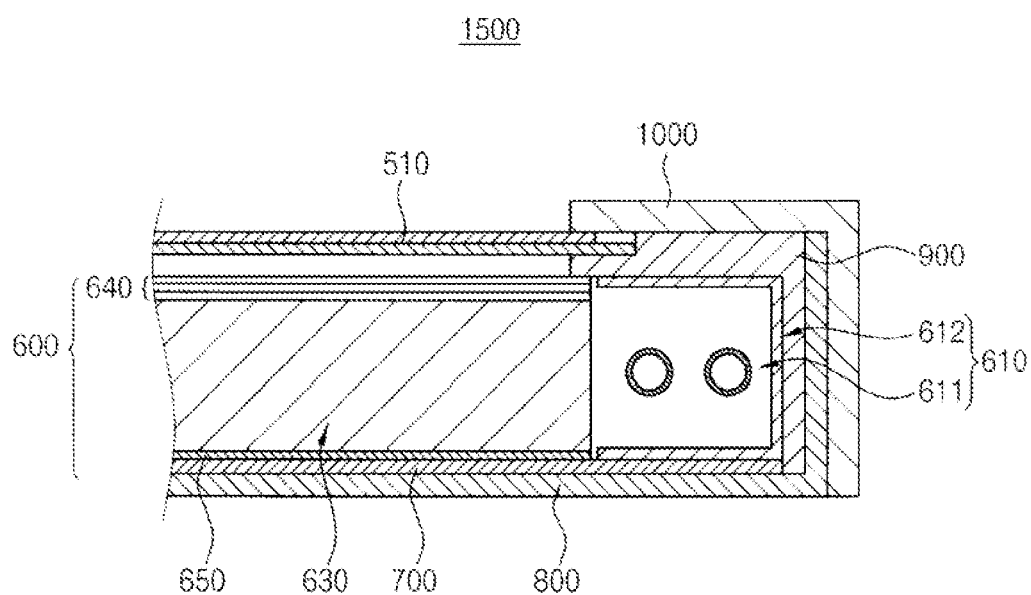
FIG. 5 is a cross-sectional view taken along a line I-I' of FIG. 4.

FIG. 4 is a plan view illustrating a display device according to an example embodiment. FIG. 5 is a cross-sectional view taken along a line I-I' of FIG. 4.

Referring to FIGS. 4 and 5, a display device 1500 according to an example embodiment includes a display panel assembly 500 that uses a light to display an image, a backlight assembly 600 that generates the light, a heat sink member 700 disposed under the backlight assembly 700, and a receiving container 800 that receives the backlight assembly 600.

The display panel assembly 500 includes a display panel 510 that displays an image, a plurality of data tape carrier packages (TCP) 520, a plurality of gate TCPs 525, a data printed circuit board (PCB) 530 and a gate PCB 535.

The display panel 510 includes a first substrate 511, which is a thin-film transistor substrate, a second substrate 512 that faces and is combined with the first substrate 511, and a liquid crystal layer (not shown) interposed between the first and second substrates 511 and 512.

The display panel 510 is substantially the same as the display panel illustrated in FIGS. 1 and 2. Thus, further explanation of display panel 510 will be omitted.

The backlight assembly 600 is disposed under the display panel assembly 500 to provide light uniformly to the display panel 510.

The backlight assembly 600 includes a lamp unit 610 that generates light, a light guide plate 630 that guides the path of the light, optical sheets 640 for improving the brightness of the light and a reflective sheet 650 that reflects light that leaks from the light guide plate 630 back toward the display panel 510.

The lamp unit 610 is disposed so that it faces a side surface of the light guide plate 630 to provide light to the light guide plate 630. In the present embodiment, the backlight assembly 600 includes one lamp unit 610. However, the number of the lamp units may be increased or decreased depending on the size of display panel 510 and the type of lamps used.

The lamp unit 610 includes a plurality of lamps 611 that generate light in response to power provided from an exterior unit, and a lamp reflecting plate 612 that provides the light generated by the lamps 611 to the light guide plate 630. The lamp unit 610 includes at least one lamp.

The lamps 611 are connected to an external power supply (not shown) to receive power and thereby generate light. The number of lamps may be increased or decreased depending on the size of the display panel 510. In the present embodiment, the lamp unit includes two lamps.

The lamp 611 has a cylindrical shape extending in a longitudinal direction. An electrode portion including a lead wire is formed at both ends of the lamp 611, which are opposite to each other in a longitudinal direction. The lead wire of the lamp 611 is electrically connected to a lamp socket (not shown) so that power is applied to the lamp 611 from an inverter, thereby generating light. For example, the lamp 611 may be a cold cathode fluorescent lamp (CCFL).

The light guide plate 630 is disposed under the display panel 510. The light guide plate 630 changes the path of the light exiting the lamp unit 610 to provide the light to the display panel 510.

A heat sink member 700 is disposed under the reflective sheet 650. Thus, the heat sink member 700 is disposed between the light guide plate 630 and the receiving container 800. The heat sink member 700 is overlapped with the lamp 611.

A length of a longer side of the heat sink member 700 may be substantially the same as that of a longer side of the display panel. Preferably, a length of a shorter side of the heat sink member 700 may be about 100 mm to about 160 mm. Preferably, a thickness of the heat sink member 700 may be about 0.4 mm. Therefore, the heat sink member 700 of the present embodiment has a longer length as compared to a conventional heat sink member. Test results show that the temperature of a display panel is reduced by about 0.7° C. by increasing the length of the heat sink member 700, and that the temperature of a display panel is reduced by about 1.4° C. by increasing the thickness of the heat sink member 700. The heat sink member may be formed of any suitable material.

The receiving container 800 is disposed under the heat sink member 700. The receiving container 800 includes a bottom plate 810 and a side wall 820 extending from the bottom plate 810 to form a receiving space. The backlight assembly 600 is received in the receiving space.

A mold frame 900 is disposed between the display panel 510 and the backlight assembly 600, and an upper cover 1000 is disposed on the display panel 510. The upper cover 1000 guides a position of the display panel 510, and secures the display panel 510 to the receiving container 800.

According to example embodiments, a heat sink member is disposed under the lamp. The heat sink member prevents the temperature of the display panel from going above the nematic-to-isotropic transition temperature of the liquid crystal molecules. Thus, black bruising of the liquid crystal may be prevented and/or reduced, thereby enhancing the display quality.

What is claimed is:

1. A display device comprising:
    a display panel comprising:
        a first substrate including a pixel electrode formed on a pixel region and electrically connected to a switching device, and a first alignment layer formed on the pixel electrode;
        a second substrate including a common electrode layer facing the first substrate, and a second alignment layer formed on the common electrode layer; and
        a liquid crystal layer including a liquid crystal composition having a nematic-to-isotropic transition temperature higher than about 80° C. interposed between the first substrate and the second substrate;
    a backlight assembly configured to provide light to the display panel;
    a receiving container receiving the backlight assembly; and
    a heat sink member disposed between the backlight assembly and the receiving container;
    wherein the liquid crystal composition has a refractive index anisotropy ($\Delta n$) of about 0.1 to about 0.12.

2. The display device of claim 1, wherein the liquid crystal composition includes a first liquid crystal compound and a second liquid crystal compound, the first liquid crystal compound includes at least one selected from the group consisting of compounds represented by the following Chemical Formulas 1 and 2, and the second liquid crystal compound includes a compound represented by the following Chemical Formula 3, wherein $X_1$, $X_2$, $X_3$ and $X_4$ independently represent an alkyl group having 1 to 4 carbon atoms, a fluorine atom or a chlorine atom where $Z_1$, $Z_2$ and $Z_3$ independently represent

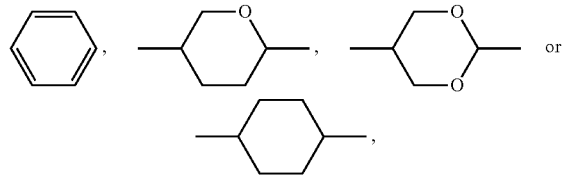

and Y represents a fluorine atom or a hydrogen atom.

<Chemical Formula 1>

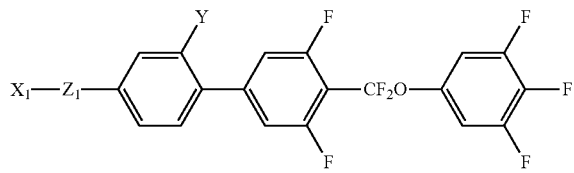

<Chemical Formula 2>

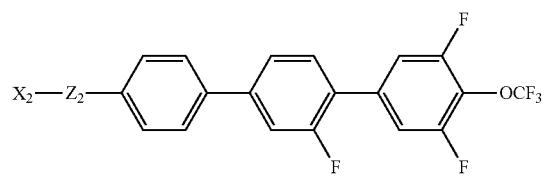

<Chemical Formula 3>

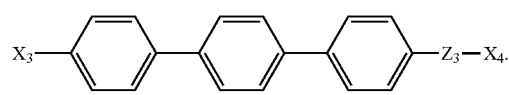

3. The display device of claim 2, wherein a content of each of the first and second liquid crystal compounds is about 4% to about 8% by weight based on a total weight of the liquid crystal composition.

4. The display device of claim 1, wherein the liquid crystal composition has a dielectric anisotropy ($\Delta \in$) of about 7 to about 10.

5. The display device of claim 1, wherein the liquid crystal composition has a rotational viscosity of about 60 mPa·s to about 70 mPa·s.

6. The display device of claim 1, wherein each of the first and second alignment layers includes a polyimide compound and a polyamic acid compound.

7. The display device of claim 1, wherein the backlight assembly comprises:
a light guide plate configure to guide light toward the display panel; and
a lamp unit facing a side surface of the light guide plate.

8. The display device of claim 7, wherein the heat sink member is overlapped with the lamp unit.

9. The display device of claim 8, wherein the a length of a longer side of the heat sink member is substantially the same as that of a longer side of the display panel, and a length of a shorter side of the heat sink member is about 100 mm to about 160 mM.

10. A method of manufacturing a display device, the method comprising:
forming a pixel electrode electrically connected to a switching device on a pixel region of a first substrate;
forming a first alignment layer on the pixel electrode;
forming a common electrode layer on a surface of a second substrate facing the first substrate;
forming a second alignment layer on the common electrode layer;
interposing a liquid crystal composition between the first and second substrates, the liquid crystal composition having a nematic-to-isotropic transition temperature higher than about 80° C. and a refractive index anisotropy (Δn) of about 0.1 to about 0.12;
applying a voltage to the first and second substrates interposing the liquid crystal composition to pre-tilt the liquid crystal composition by an angle of about 4.5° to about 5.5°, thereby forming a display panel having a liquid crystal layer;
providing a backlight assembly providing a light to the display panel;
providing a receiving container receiving the backlight assembly; and
disposing a heat sink member between the backlight assembly and the receiving container.

11. The method of claim 10, wherein the voltage is about 4 V to about 5 V.

12. The method of claim 10, wherein the liquid crystal composition includes a first liquid crystal compound and a second liquid crystal compound, the first liquid crystal compound includes at least one selected from the group consisting of compounds represented by the following Chemical Formulas 1 and 2, and the second liquid crystal compound includes a compound represented by the following Chemical Formula 3, wherein $X_1$, $X_2$, $X_3$ and $X_4$ independently represent an alkyl group having 1 to 4 carbon atoms, a fluorine atom or a chlorine atom where $Z_1$, $Z_2$ and $Z_3$ independently represent

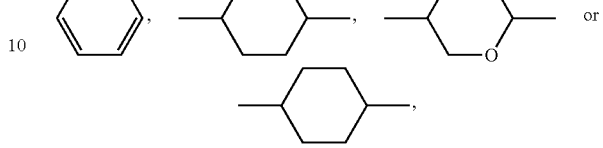

and Y represents a fluorine atom or a hydrogen atom.

<Chemical Formula 1>

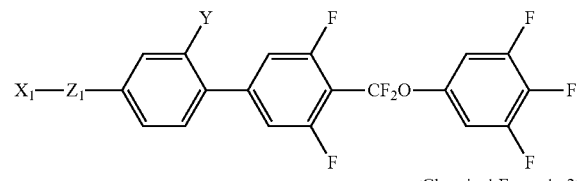

<Chemical Formula 2>

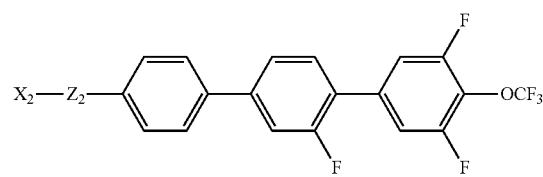

<Chemical Formula 3>

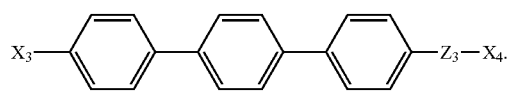

13. The method of claim 10, wherein each of the first and second alignment layers includes a polyimide compound and a polyamic acid compound.

14. The method of claim 10, wherein the backlight assembly comprises:
a light guide plate configured to guide the light to provide the light to the display panel; and
a lamp unit facing a side surface of the light guide plate.

15. The method of claim 14, wherein the heat sink member is overlapped with the lamp unit.

* * * * *